Figure 6:
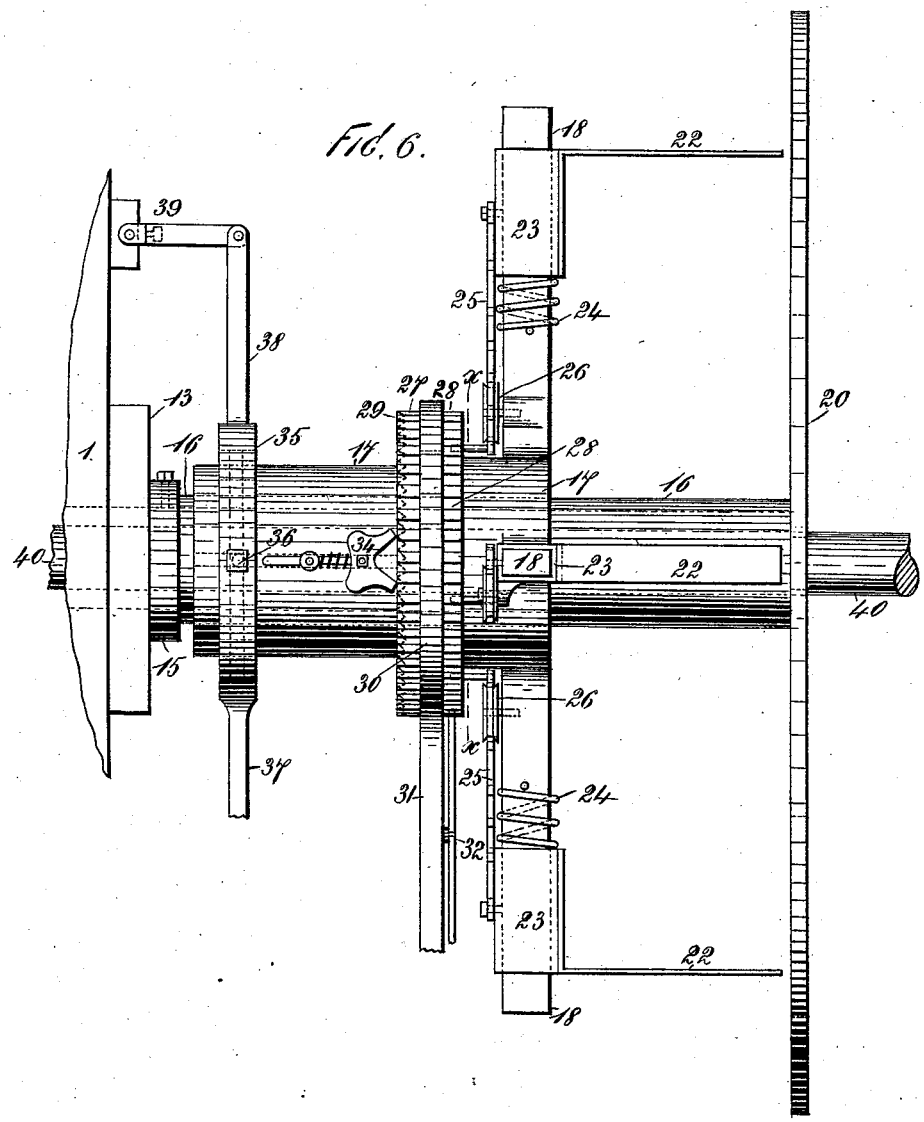

(No Model.)
3 Sheets—Sheet 1.
C. HOWARD.
COTTON PRESS.
No. 536,145.   Patented Mar. 19, 1895.
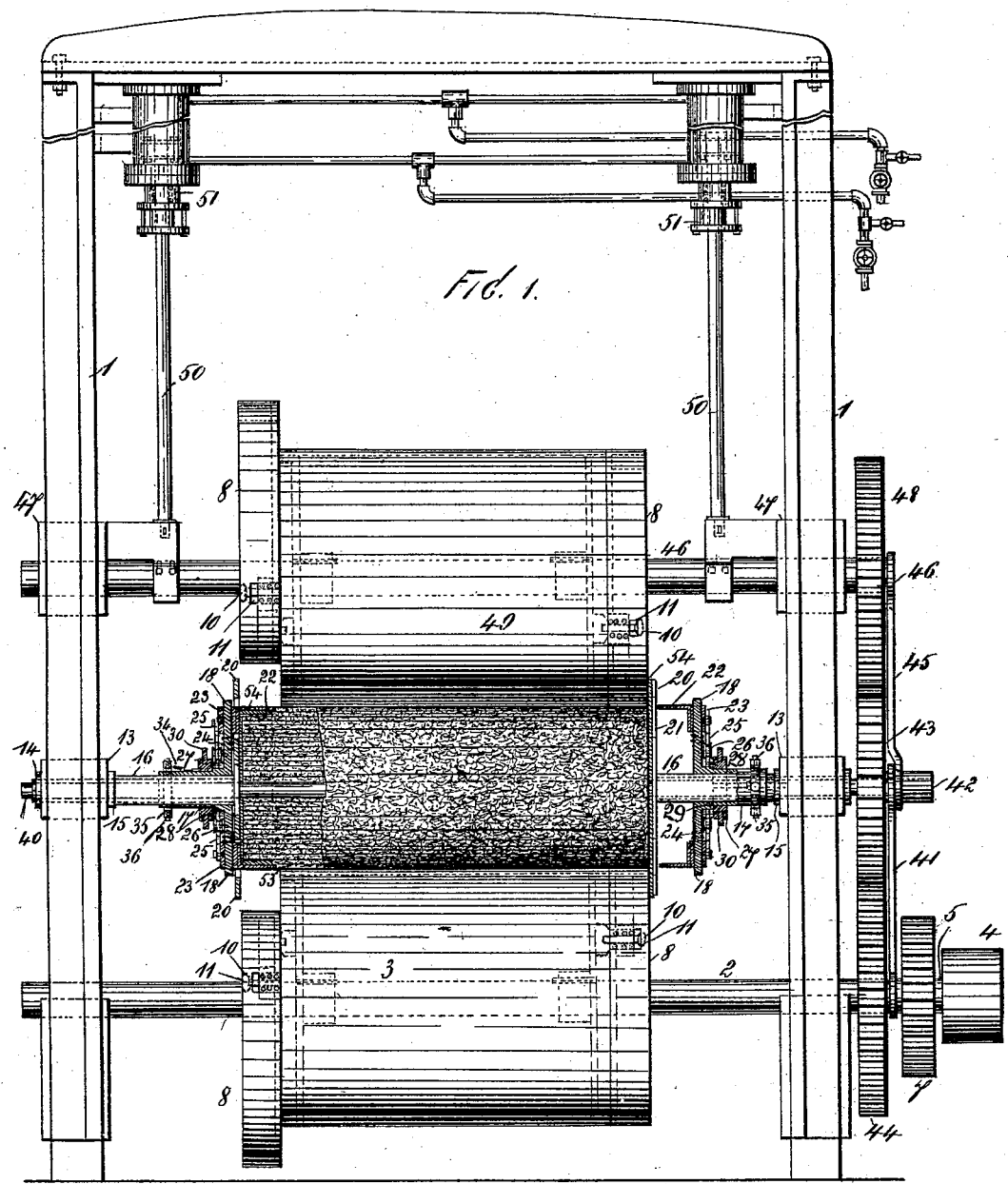
Witnesses:
Jno. Buckler,
Wm. H. Leightman
Inventor.
Charles Howard,
By A. M. Pierce,
Attorney.

(No Model.) 3 Sheets—Sheet 2.
C. HOWARD.
COTTON PRESS.
No. 536,145. Patented Mar. 19, 1895.
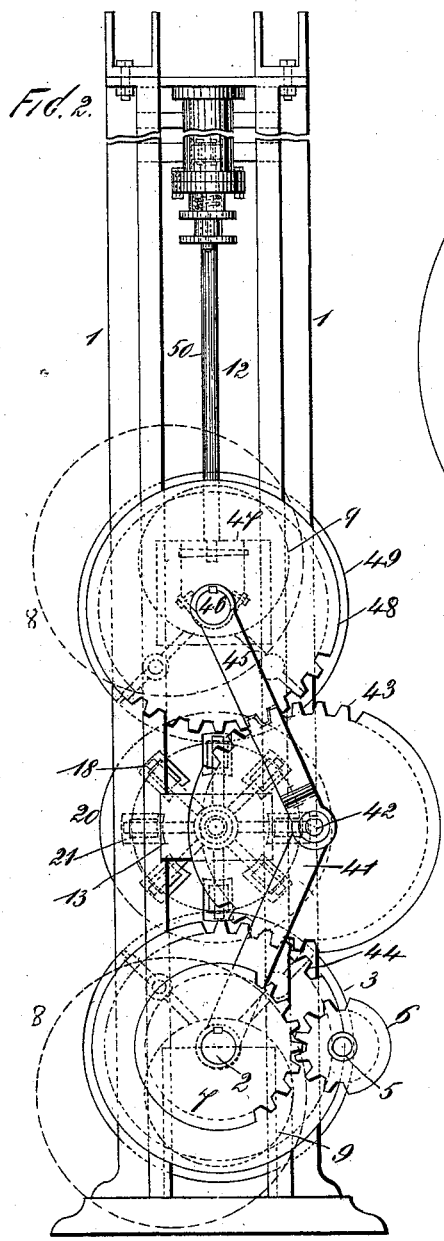
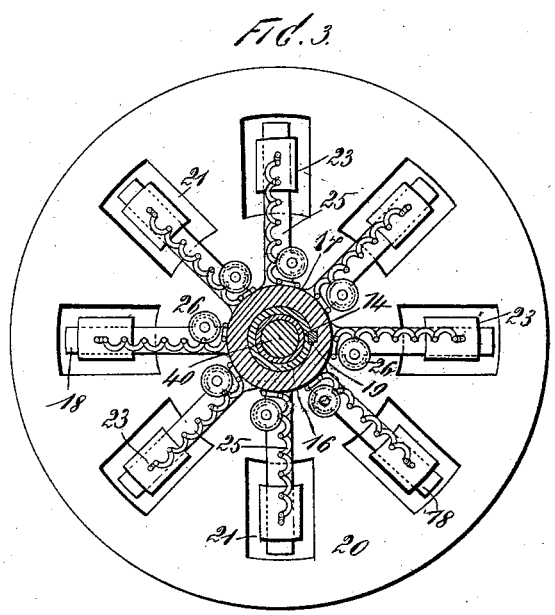
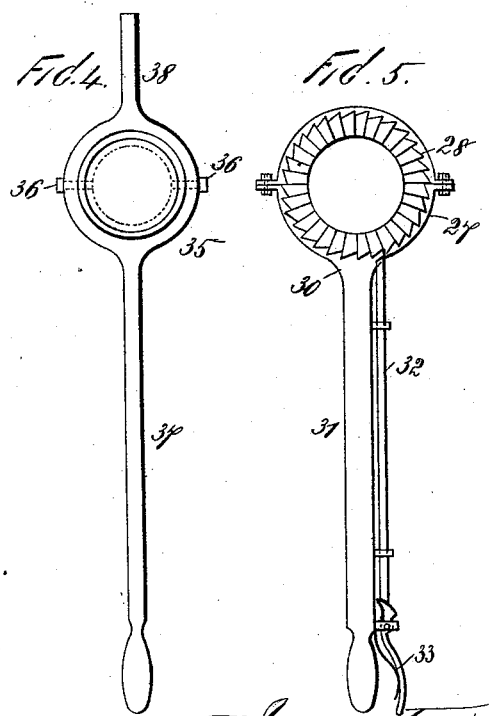
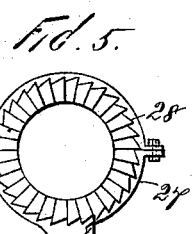
Witnesses:
John Buckler
Wm H. Weightman
Inventor:
Charles Howard,
By A. M. Pierce,
Attorney.

(No Model.) 3 Sheets—Sheet 3.

C. HOWARD.
COTTON PRESS.

No. 536,145. Patented Mar. 19, 1895.

Witnesses:
John Buckler
Wm H Weightman

Inventor
Charles Howard
By A. M. Pierce,
Attorney.

UNITED STATES PATENT OFFICE.

CHARLES HOWARD, OF NEW YORK, N. Y., ASSIGNOR OF ONE-HALF TO HENRY LEWIS, OF PHILADELPHIA, PENNSYLVANIA.

COTTON-PRESS.

SPECIFICATION forming part of Letters Patent No. 536,145, dated March 19, 1895.

Application filed January 14, 1895. Serial No. 534,767. (No model.)

*To all whom it may concern:*

Be it known that I, CHARLES HOWARD, a citizen of the United States, residing in the city, county, and State of New York, have invented a new and useful Improvement in Cotton-Presses, of which the following is a specification.

My invention relates especially to devices employed for baling cotton, the present application being particularly for mechanism for applying the head or covering to a circular bale; and has for its object the provision of means and mechanism for so applying the head while the body of the bale is still under the full power of compression exerted in forming the bale.

To attain the desired end, my invention consists essentially in compressing rolls, the ends whereof are made movable in relation to the axis of the roll, so as to relieve the pressure near the end of the bale when the requisite amount of cotton has been accumulated, and in mechanism for applying to the bale a head or end covering while the body of the bale is still under the full compressing power; and my invention also involves certain other novel and useful combination or arrangements of parts, and peculiarities of construction and operation, all of which will be hereinafter first fully described, and then pointed out in the claims.

In the accompanying drawings, forming a part hereof, Figure 1 is an end elevation, and partial axial section of a cotton press embodying my invention. Fig. 2 is a side elevation. Fig. 3 is an enlarged outer face view of the mechanism for placing the end covering of the bale in position, at line x—x of Fig. 6, and Figs. 4 and 5 are enlarged views of details of the operating devices employed therewith. Fig. 6 is an enlarged side elevation of the end placing mechanism.

Like numerals of reference, wherever they occur, indicate corresponding parts in all the figures.

1 is the main frame of the press.

2 is a shaft permanently mounted thereon, and bearing a roller 3.

5 is a driving shaft, mounted in the main frame, and bearing a pulley 4, and gear 6, which meshes with a gear 7 upon the shaft 2.

The ends, 8, of the roller 3 are made movable, as they are mounted upon eccentrics, 9, illustrated by dotted lines in Fig. 2. These movable ends 8 are normally held in place by spring bolts, 10, which may be retracted through holes, 11, in the ends 8.

Mounted in slide-ways 12 in the main frame, are vertically movable bearings, 13.

14 are hollow sectious of shafts, journaled in said bearings 13, and 15 are collars placed thereon. Mounted upon each shaft 14 is a sleeve 16.

17 is a hub provided with radial arms 18, said hub being held against rotation upon the sleeve 16 by a feather or key 19, while it may be moved longitudinally upon said sleeve, as hereinafter described.

20 is a disk, mounted upon the inner end of the sleeve 16, said disk being slotted, as at 21.

22 are fingers projecting from square eyes 23, arranged to move upon the arm 18, and be passed through the slots 21 in disks 20. These eye pieces 23 of the arms 22 are normally forced outward by springs, 24. Connected to each eye piece 23, is a chain 25, passing around a pulley 26, and engaging with a rotatable ring 27, provided on one edge with ratchet teeth, 28, and on the other with ratchet teeth 29. Surrounding the ring 27 and entering a circumferential groove therein, is a yoke, 30, provided with a manipulating handle 31 and a pawl 32, normally held out of engagement with the ratchet 28 by a spring 33.

34 is a double pawl, mounted upon the hub 17, and arranged to hold the ring 27 against movement in either direction, or leave it free, as desired.

35 is a yoke, surrounding the hub 17 and engaging with a circumferential groove therein by means of screws 36. This yoke is provided with a manipulating handle 37 at one side, and a projecting arm 38 at the other which is linked to the main frame at 39.

40 is a removable shaft or core which passes through the hollow sections of shaft 14, and upon which the cotton bale is formed.

41 is an eye bar, passing from the shaft 2 to a swinging shaft 42, whereon is mounted an idle gear wheel 43, which meshes with a gear 44 mounted upon the shaft 2.

45 is an eye bar passing from the swinging shaft 42 to a shaft 46 journaled in bearings 47 mounted in the slide-way 12.

48 is a gear wheel fixed upon the shaft 46, and meshing with the idler 43. Mounted upon the shaft 46 is a compressing roller 49 arranged precisely like the roller 3. Connected to the shaft 46 and bearings 47 are piston rods 50, passing to hydraulic mechanism 51.

When constructed and arranged in accordance with the foregoing description, the operation of my baling press is as follows: In starting to form the bale, the movable ends of the rollers 3 and 49 are in place, as shown at the right hand in Fig. 1, but the core-shaft 40 rests upon the roller 3, and the roller 49 rests upon said shaft. Disks of paper 54, for forming the ends of the bale are placed in position when the core shaft is applied. In starting the bale, a core of paper, or the equivalent, is first wound upon the core-shaft, when the rollers are first revolved, and then a continuous layer of cotton is wound thereon until the bale is the requisite diameter. During this process, the necessary pressure to form the bale with sufficient compactness is applied to the rollers by means of the hydraulic mechanism. When the bale has reached substantially the diameter indicated in Fig. 1, a forked bar is passed into the opening 11 in the movable ends of the rollers 3 and 49; the catch bolt thrown back thereby, and then by means of the leverage obtained by the introduction of this bar, the movable ends 8 may be turned upon their eccentrics throwing them away from the ends of the bale. I have shown and described one method of relieving the pressure from the ends of the bale in order to apply the end coverings, but I do not confine myself to this special arrangement, as any other means of so relieving the pressure of the rollers for a short distance upon the bale for the purpose of passing a cap piece or covering thereover, would come within the spirit of my invention. After the ends 8 of the rollers have been placed in the position indicated at the left of Fig. 1, by grasping the lever 37, and pushing thereon toward the bale, the hub and arms carrying the fingers 22 will be forced inward the fingers passing over the bale on all sides and then by drawing said fingers inward through the medium of the lever 31, turning the ring 27 and pulling upon the chains 25, the paper disk 54 will be folded over the end of the bale, forming a cap piece, as plainly shown in Fig. 1. The roller ends 8 are now forced back into their initial position as far as is posssble with the lever used in releasing them, and by giving the rollers 3 and 49 a turn, the catches 10 will again engage in their initial position, locking the pieces 8 in place. The fingers 22 are so mounted and arranged as to permit independent pressure into the cotton without danger of disarranging any of the parts. After the end piece 54 has been located in place, by means of the lever 37 the fingers 22 may be easily withdrawn from contact with the bale. The above operation is performed at each end of the bale, and then an outer body covering of paper, or other material, is applied and if desired, wire may be placed thereover, or any other binding employed. After the bale has been thoroughly incased, the hydraulic pressure is removed the fingers 22 withdrawn, the core-shaft 40 drawn out, and the bale released from the press, ready for shipment.

Having now fully described my invention, what I claim as new therein, and desire to secure by Letters Patent, is—

1. A baling press in which is comprised a pair of compressing rolls, one of which rotates upon a shaft in fixed bearings, and the other in vertically movable bearings; means for applying pressure to the upper roll; movable end pieces to both of said rolls; and means for applying a cap or end piece to each end of the bale while the bale is under compression in the press, the whole combined and arranged to operate substantially as shown and described.

2. In a baling press, a compressing roll, a portion of the ends whereof are movable in relation to the axis of rotation of the roll.

3. In a baling press, a compressing roll having a portion of its ends eccentrically movable, substantially as shown and described.

4. In a baling press, the combination with compressing rolls, a portion of the ends whereof are movable in relation to the axis of rotation of the rolls, of means for applying an end covering to the bale while the bale is under compression in the press, substantially as shown and described.

5. In a baling press, the combination with means for compressing a bale, of means for applying end coverings or heads to the bale while the body thereof is under pressure in the press.

6. In a device of the character herein specified, the combination with the body of a compressed roller, of an eccentrically movable end, and means for moving said end, and locking it in place, substantially as shown and described.

7. In a device of the character herein specified, the combination with the main frame of vertically movable bearings mounted in the sides thereof; hollow sections of shaft mounted in said bearings, a sleeve surrounding each of said hollow sections of shaft; a longitudinally movable hub bearing radial arms located upon said sleeve, and bearing horizontal fingers, and means for moving said hub and connected parts horizontally, and the fingers radially, the whole combined and arranged to operate, substantially as shown and described.

8. In a device of the character herein specified, the combination with a horizontally movable hub bearing radial arms, of radially movable fingers mounted upon said arms, normally thrown outward by springs, and said springs substantially as shown and described.

9. In a device of the character herein specified, a horizontally movable hub having radial arms, in combination with horizontal radially movable fingers mounted upon said arms, springs normally forcing said arms outward, and means for simultaneously drawing said fingers inward toward the hub, substantially as shown and described.

10. In a device of the character herein specified, the combination with a horizontally movable hub provided with radial arms, of horizontal fingers, loosely mounted upon said arms, and adapted to move inward independently when pressed upon, and be simultaneously drawn inward, substantially as shown and described.

11. In a device of the character herein specified, the combination with a hub bearing radial arms, of horizontal fingers loosely mounted thereon, a rotatable ring, and connections between said fingers and rotatable ring, whereby said fingers may be simultaneously drawn inward toward the hub, substantially as shown and described.

12. The combination with the radial arms projecting from a common hub, and said hub of eye-pieces movably mounted on said arms and bearing horizontal fingers; chains connecting said eye-pieces and a ring encircling said hub; pulleys mounted upon the hub and under which the chains pass, and means for drawing said chains inward, substantially as shown and described.

13. In a device of the character herein specified, the combination with a hollow section of shafting mounted in a movable bearing in the side of the main frame, of a slotted disk fixed upon the inner extremity of a sleeve mounted upon said hollow shaft; a hub bearing radial arms and horizontal fingers mounted upon said sleeve, and means for moving said hub and connected parts horizontally, substantially as shown and described.

14. In a device of the character herein specified, the combination with a hollow section of shaft mounted in a vertically movable bearing in the side of the main frame, of a slotted disk fixed upon the inner extremity of a sleeve mounted upon said hollow shaft; a hub bearing radial arms and horizontal fingers mounted upon said sleeve; and independent means for moving, the hub and connected parts horizontally and the horizontal fingers radially, substantially as shown and described.

15. In a device of the character herein specified, the combination with the horizontally movable hub, and the radially movable fingers mounted upon the arms projecting from said hub, of a ring encircling said hub, bearing a ratchet upon each side; devices connecting each finger with said ring a double pawl adapted to engage with one of said ratchets, and a yoke encircling the ratchet ring and bearing a manipulating handle and pawl, substantially as shown and described.

16. The combination with the horizontally movable hub and connected parts mounted upon a horizontal sleeve, of a bearing for a yoke, and a yoke encircling said hub, arranged to rise and fall with said hub, and to move said hub horizontally substantially as shown and described.

CHARLES HOWARD.

Witnesses:
A. M. PIERCE,
WM. H. WEIGHTMAN.

It is hereby certified that the name of the assignee in Letters Patent No. 536,145, granted March 19, 1895, upon the application of Charles Howard, of New York, N. Y., for an improvement in "Cotton-Presses," was erroneously written and printed "Henry Lewis," whereas said name should have been written and printed *Henry Levis;* and that the said Letters Patent should be read with this correction therein that the same may conform to the record of the case in the Patent Office.

Signed, countersigned, and sealed this 26th day of March, A. D., 1895.

[SEAL.]

JNO. M. REYNOLDS,
*Assistant Secretary of the Interior.*

Countersigned:
    JOHN S. SEYMOUR,
        *Commissioner of Patents.*